(12) United States Patent
Firth

(10) Patent No.: US 9,125,393 B2
(45) Date of Patent: Sep. 8, 2015

(54) BURROWING RODENT STICK

(71) Applicant: Gregory Scott Firth, Vista, CA (US)

(72) Inventor: Gregory Scott Firth, Vista, CA (US)

( * ) Notice: Subject to any disclaimer, the term of this patent is extended or adjusted under 35 U.S.C. 154(b) by 330 days.

(21) Appl. No.: 13/743,571

(22) Filed: Jan. 17, 2013

(65) Prior Publication Data
US 2014/0196357 A1    Jul. 17, 2014

(51) Int. Cl.
*A01M 25/00*    (2006.01)

(52) U.S. Cl.
CPC ........... *A01M 25/006* (2013.01); *A01M 25/002* (2013.01)

(58) Field of Classification Search
CPC .. A01M 25/00; A01M 25/002; A01M 25/006
USPC .................................................. 43/124, 131
See application file for complete search history.

(56) References Cited

U.S. PATENT DOCUMENTS

| | | | | | |
|---|---|---|---|---|---|
| 1,856,809 | A | * | 5/1932 | Gibson et al. | 111/92 |
| 2,390,686 | A | * | 12/1945 | Bishop | 111/95 |
| 2,539,271 | A | * | 1/1951 | Rianda | 111/99 |
| 2,923,039 | A | * | 2/1960 | Imus | 43/131 |
| 3,550,542 | A | * | 12/1970 | Hollis | 111/95 |
| 3,589,560 | A | * | 6/1971 | Wilcox | 222/31 |
| 3,771,474 | A | * | 11/1973 | Elston | 111/96 |
| 3,815,526 | A | * | 6/1974 | Christopherson | 111/7.2 |
| 4,413,440 | A | * | 11/1983 | Schultz | 43/124 |
| 4,841,668 | A | * | 6/1989 | McKenzie | 43/124 |
| 5,548,921 | A | * | 8/1996 | Kleisath | 43/124 |
| 6,502,720 | B2 | * | 1/2003 | Schwederski | 221/268 |
| 2007/0199956 | A1 | * | 8/2007 | Cramer | 222/368 |
| 2009/0082204 | A1 | * | 3/2009 | Royalty et al. | 504/101 |

FOREIGN PATENT DOCUMENTS

| | | | | | |
|---|---|---|---|---|---|
| FR | 2767026 | A1 | * | 2/1999 | A01M 25/00 |
| FR | 2865349 | A1 | * | 7/2005 | A01M 25/00 |
| GB | 2397740 | A | * | 8/2004 | A01M 25/00 |

* cited by examiner

*Primary Examiner* — Christopher P Ellis
*Assistant Examiner* — Michael Wang

(57) ABSTRACT

A burrowing rodent extermination device comprising a stick form poison bait (10) in a dispenser. (22) The dispenser (22) has an elongated tubular body (23) with a foot (21) disposed to slide thereon for setting ground penetration depth. The bait stick (10) is gravity fed into a rodent tunnel (24) through the tubular body (23) thereby providing more bait (10) for consumption. A rod (12) is attached to the top of the bait stick (10) for lowering and lifting without any human contact. (22) The rod (12) is visible above ground and indicates consumption of the bait stick. (10) A marker (15) is attached to a top potion of the rod (12) to make the device more visible.

1 Claim, 1 Drawing Sheet

BURROWING RODENT STICK

CROSS-REFERENCE TO RELATED APPLICATIONS

Not Applicable

FEDERALLY SPONSORED RESEARCH

Not Applicable
SEQUENCE LISTING OR

PROGRAM

Not Applicable

FIELD OF INVENTION

A device for exterminating burrowing rodents comprising a stick form consumable poison bait disposed within a dispenser.

BACKGROUND

There exist many devices and methods for controlling burrowing rodents which cause many problems as discussed in previous literature. One popular group utilizes a spring loaded trap. Most spring loaded traps require a tunnel entrance to be opened to insert the trap. A rodent is cinched after a trigger is tripped as in U.S. Pat. No. 2,231,984 by Louis H. Anderson filed Aug. 13, 1940. A drawback with these devices is that some rodents push soil to block tunnel entrances. The pushed soil trips the device without capturing the rodent. Repeated attempts are required for success. Another drawback is the need to open the tunnel entrances to insert the device. Many hours of digging and searching for tunnels is needed when large surface areas need to be treated. A different approach is seen in FR 2731584 "Mechanical Device for Extermination" by Meynieux Jean filed on 1995 Mar. 15. A spring loaded trap is placed vertically in a hole made by a probe that has located a rodent tunnel. A trigger mechanism is tripped which results in a harpooning of the rodent. Once again, the pushing of soil by the rodent may cause the trap to misfire. The advantage of this device is that tunnel entrances do not need to be opened and exposed.

Many popular devices for exterminating burrowing rodents utilize poison bait such as U.S. Pat. No. 1,990,262 "Device for Poisoning Rodents" by John Bailey filed Nov. 28, 1933. These devices utilize a probe for locating a rodent tunnel in combination with a poison dispensing mechanism. Another example of this type of device is U.S. Pat. No. 2,539,271 "Gopher Probe" by Tom A. Rianda filed Oct. 22, 1947. In this configuration a tubular probe locates a tunnel which is used to drop poison bait. The drawback with these devices is that poison left in the ground is toxic to the environment and is unsuitable for organic gardening. Poison left in the ground may also eventually be consumed by non-targeted animals. Once poison is buried in the ground it is impossible to retrieve. It is uneconomical and hazardous to bury large amounts of poison bait in the ground as only a small portion is actually consumed.

Another poison bait system utilizes poisoned stakes such as U.S. Pat. No. 7,235,254 "Poisoned Stake Device, Method of Making and Method of Using" by James E. Speed filed Aug. 22, 2003 or CN20112035110U 20110209 "Mulberry Longicorn Killing Stick" by Chengyan Wang filed 2011 Aug. 24. A variation of the poison stake is seen in CN20101513115 20101020 "Poison Stick for Controlling Tree Trunk Pests and Making Thereof" by Baolin Liu filed 2011 Apr. 6. This type of device is typically made of solid material which is driven into the ground to exterminate a pest. In similarity, delivering a stick form consumable poison into the tunnel of a burrowing rodent is the subject of the present invention.

OBJECT AND ADVANTAGES

To provide a treatment device that is quick to implement.
To provide a treatment device that is economical to use.
To provide a treatment that is non-evasive for gardens.
To provide a treatment that leaves no toxic materials in the ground.
To provide a bait stick that is reusable.
To provide a visual indicator that reveals the length of the bait stick underground.
To provide a treatment that can be used over large areas.
To provide a device that is easy to manufacture and use.
To eliminate human handling of poison bait.
To utilize gravitational force to place additional poison bait into a tunnel.
To provide a device that is child, pet and wildlife safe.

DRAWING NUMERALS

10. Bait stick
12. Rod
15. Marker
17. Probe assembly
18. Shaft
19. Hand grip
20. Ground surface
21. Foot
22. Dispenser assembly
23. Elongated tubular body
24. Rodent tunnel

DETAILED DESCRIPTION

Figure 1:
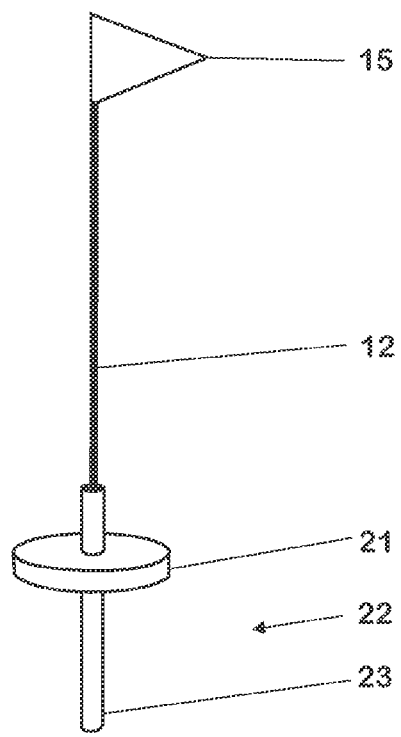
FIG. 1. The device with a bait stick enclosed in a dispenser.
Figure 3:
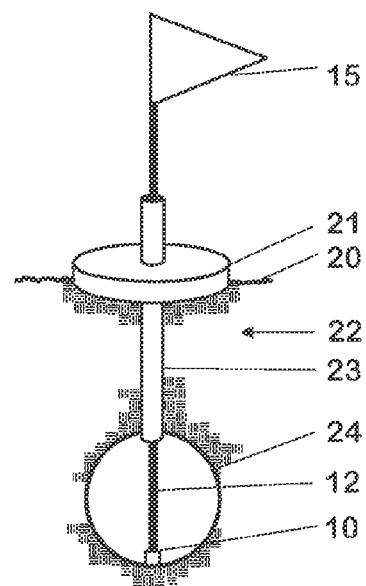
FIG. 3. The device indicating that a bait stick has been consumed.
Figure 2:
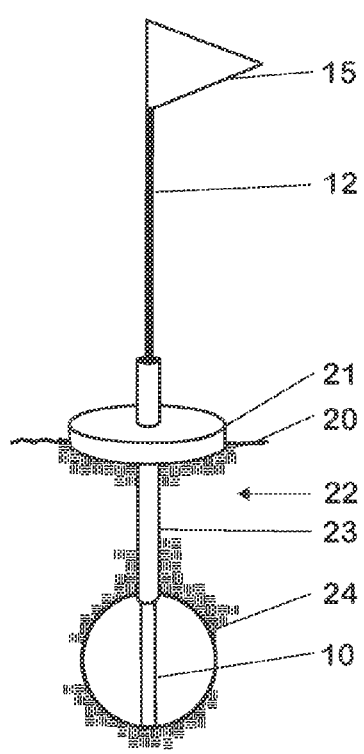
FIG. 2. The device with a bait stick in a rodent tunnel.
Figure 4:
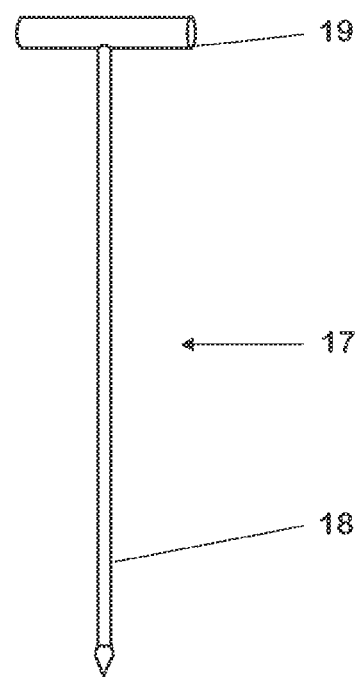
FIG. 4. A typical probe as shown by prior art.

A device for exterminating burrowing rodents such as gophers is comprised of a stick form consumable poison bait 10 disposed within a dispenser. 22 The bait stick 10 is a scented, poisoned formulation shaped into a stick form using a binding agent. The formulation is extruded or pressed and then dried resulting in a structure and texture resembling that of roots which is the primary food of burrowing rodents. The root like shape and texture of the bait stick 10 is not foreign to a rodent which will be more likely to consume it. In contrast, conventionally available poison bait is in pelletized form. Pelletized bait is typically deposited in a pile on a tunnel floor which is not naturally occurring for a rodent. Pelletized bait is not retrievable and becomes a hazard for wildlife as water carries toxic materials to unintended destinations. Pelletized bait cannot be used where crops are grown as consumable plants absorb toxins. Safe handling of pelletized bait requires gloves to prevent skin contact which most consumers neglect. Spilled pelletized bait further creates a hazard to wildlife, pets and humans through unintentional absorption. These drawbacks are improved upon through the use of the bait stick 10 and the dispenser. 22

The bait stick 10 is retrievable through the use of a rod. 12 The rod 12 is attached to one end of the bait stick. 10 The rod 12 is used to raise or lower the bait stick 10 without human contact. A second function of the rod 12 is to visually indicate the amount of consumption of the bait stick. 10 The dispenser 22 allows the bait stick 10 to be gravity fed into a tunnel 24 which in turn lowers the rod 12 as consumption occurs. A marker, 15 such as a flag is attached to a top portion of the rod 12 making it easy to find especially in tall grass. The marker 15 also warns that toxic materials underground are not to be tampered with. Consumers can monitor the exact location and condition of the device at a glance.

The dispenser 22 is made up of two parts. One part is an elongated tubular body 23 and the other is a foot. 21 The tubular body 23 has two purposes. The first is to enclose the bait stick 10 protecting it from unintended consumption, human contact, and moisture. The second purpose of the tubular body 23 is to allow the bait stick 10 to lower unobstructed into the tunnel 24 using gravitational force. The second part of the dispenser 22 is the foot. 21 The foot 21 slides laterally along the tubular body. 23 The purpose of the foot 21 is to set the amount of penetration into the ground. 20 The amount of penetration is determined through the use of a probe. 17

The probe 17 has three purposes. The first purpose is to locate rodent tunnels. 24 The second purpose is to create an access hole (not shown) for setting the device, and the third is to determine the depth of the tunnel 24 below ground. 20 The typical probe 17 has two parts with the first being a shaft 18 with a point at one end for penetrating the ground. 20 The other end of the shaft 18 is fitted with a hand grip 19 to allow a person to apply downward force on the shaft. 18

OPERATION

Treatment for exterminating burrowing rodents is accomplished by first using the probe 17 in proximity to a mound of fresh soil that has been push up to the surface. Rodent tunnels 24 are identified as the probe 17 suddenly drops due to the loss of resistance while penetrating the ground. 20 The depth of the tunnel 24 is estimated by the distance of ground penetration before the probe 17 dropped. An access hole (not shown) is thereby created where the device is set.

The device is made ready for inserting into the access hole (not shown) by sliding the foot 21 laterally along the tubular body 23 to match the estimated depth of the tunnel. 24 The purpose of setting the depth of the tunnel 24 is to retain the soil from closing in around the access hole (not shown) and allow the bait stick 10 to fall unobstructed to the tunnel floor. 24 Insert the device into the access hole (not shown) and use the rod 12 to lower the bait stick 10 into the tunnel. 24

The rodent consumes the bait stick 10 which shortens the length. An additional portion of bait stick 10 falls into the tunnel 24 by gravitational force. The rod 12 and marker 15 which are attached to the top of the bait stick 10 lower in proportion to the amount of bait stick 10 consumed. If the marker 15 is observed actively moving, then consummation is underway.

The consumption of one bait stick 10 has sufficient poison to cause a rodent to perish. There is also product satisfaction when a consumed bait stick 10 is discovered. A new bait stick 10 can be placed in the dispenser 22 and reused. If the bait stick 10 has not been consumed after a reasonable time, then the rod 12 is used to lift the bait stick 10 out of the access hole (not shown) and back into the dispenser. 22 The bait stick 10 is enclosed and protected from unintentional consumption, human contact, and moisture. Toxic materials are removed from the ground creating a better wildlife habitat and a crop friendly environment. Unconsumed bait sticks 10 are placed in new active locations making the best economical solution possible.

Hiring professional exterminators for burrowing rodents is expensive and not practical for most applications. Professional exterminators commonly use pelletized bait for treatment which has the above mentioned drawbacks especially when a large area of ground is infested. There is no product satisfaction since there is no way of checking to see if rodents actually have consumed poison bait or not. The professional exterminator, property owner, or gardener will find the present invention to be a great improvement over previous devices especially when treating large areas of ground.

The invention claimed is:

1. A device for exterminating burrowing rodents, comprising:
   a rod having a top portion and a bottom portion;
   a marker attached to the top portion of the rod;
   a poison bait formed as a solid stick with two ends, wherein one end is attached to the bottom portion of the rod;
   a dispenser having an elongated tubular body with an upper opening and a lower opening;
   a foot attached to the dispenser, wherein the foot is slidable along the tubular body;
   wherein the rod and the poison bait are lowerable and retrievable from within the tubular body of the dispenser, and when lowered, the poison bait extends beyond the lower opening of the dispenser and the marker is positioned above the upper opening of the dispenser.

* * * * *